United States Patent
Baechle et al.

(10) Patent No.: US 6,179,392 B1
(45) Date of Patent: Jan. 30, 2001

(54) METHOD OF ELIMINATING THE INCLUSION OF GAS BUBBLES WHEN FILLING OF BRAKE FLUID INTO A HYDRAULIC AUTOMOTIVE VEHICLE BRAKE SYSTEM

(75) Inventors: Martin Baechle, Glashütten; Stefan A. Schmitt, Johannesberg, both of (DE)

(73) Assignee: Continental Teves AG & Co., OHG (DE)

( * ) Notice: Under 35 U.S.C. 154(b), the term of this patent shall be extended for 0 days.

(21) Appl. No.: 09/331,481

(22) PCT Filed: Dec. 5, 1997

(86) PCT No.: PCT/EP97/06808

§ 371 Date: Sep. 22, 1999

§ 102(e) Date: Sep. 22, 1999

(87) PCT Pub. No.: WO98/28173

PCT Pub. Date: Jul. 2, 1998

(30) Foreign Application Priority Data

Dec. 23, 1996 (DE) .............................................. 196 54 087

(51) Int. Cl.[7] .................. B60T 8/34; B60T 8/48
(52) U.S. Cl. .................. 303/113.1; 141/98; 188/352; 303/119.1
(58) Field of Search .............................. 188/352; 141/98; 60/584; 303/113.1, 119.1, 119.2, 12, 119.3, 113.3, 125

(56) References Cited

U.S. PATENT DOCUMENTS

| | | | |
|---|---|---|---|
| 4,702,532 | * | 10/1987 | Anderson .............................. 188/352 |
| 4,902,077 | * | 2/1990 | Belart et al. ........................ 188/352 |
| 5,324,101 | * | 6/1994 | Kehl et al. .......................... 188/352 |
| 5,401,086 | * | 3/1995 | Nishikimi et al. . |
| 5,505,529 | * | 4/1996 | Siegel et al. ........................ 188/352 |
| 5,538,335 | * | 7/1996 | Saito et al. ......................... 188/352 |
| 5,605,384 | * | 2/1997 | Johnston et al. ................... 188/352 |
| 5,788,344 | * | 8/1998 | Friedow et al. .................... 188/352 |
| 5,944,068 | * | 8/1999 | Hool ................................... 188/352 |
| 5,975,655 | * | 11/1999 | Toda ................................... 188/352 |

FOREIGN PATENT DOCUMENTS

| | | |
|---|---|---|
| 38 06 840 | 9/1989 | (DE) . |
| 39 35 353 | 4/1991 | (DE) . |
| 43 06 921 | 9/1994 | (DE) . |
| 43 37 133 | 5/1995 | (DE) . |
| 196 32 343 | 5/1997 | (DE) . |
| 196 02 219 | 7/1997 | (DE) . |
| 0 275 351 | 7/1988 | (EP) . |
| 0 323 889 | 7/1989 | (EP) . |
| 0 482 367 | 4/1992 | (EP) . |
| 691 07 989 | 3/1995 | (EP) . |
| 0 543 187 | 9/1996 | (EP) . |
| 7-165046 | 6/1995 | (JP) . |

OTHER PUBLICATIONS

Search Report of the German Patent Office for Application No. 196 54 087.9.

* cited by examiner

Primary Examiner—Douglas C. Butler
(74) Attorney, Agent, or Firm—Rader, Fishman & Grauer PLLC

(57) ABSTRACT

The present invention relates to a method of bubble-free filling of brake fluid into a hydraulic automotive vehicle brake system, which is equipped with slip control and/or automatic braking intervention, the pump of which, under operating conditions, delivers brake fluid from the secondary circuit into the primary circuit according to the return delivery principle. In this arrangement, exclusively the primary circuit is bled and filled with undersaturated brake fluid.

5 Claims, 3 Drawing Sheets

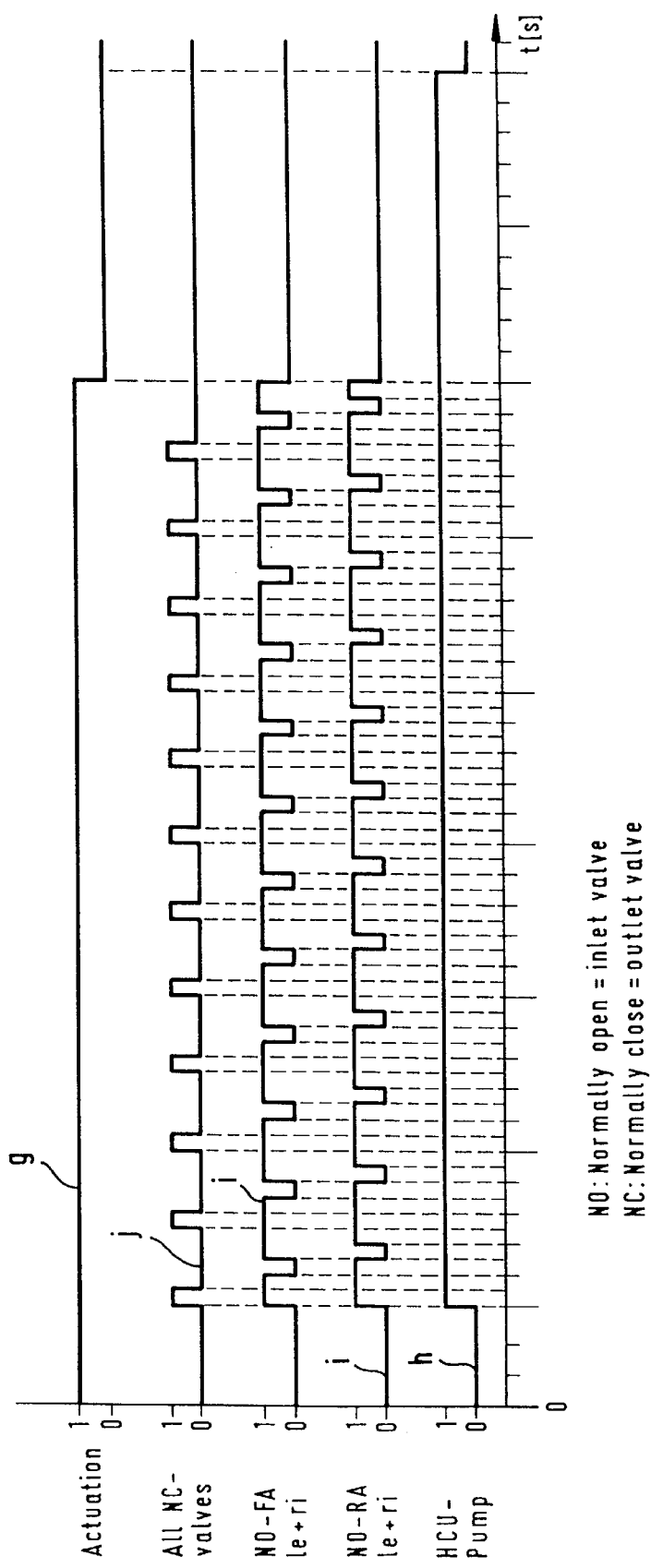

METHOD OF ELIMINATING THE INCLUSION OF GAS BUBBLES WHEN FILLING OF BRAKE FLUID INTO A HYDRAULIC AUTOMOTIVE VEHICLE BRAKE SYSTEM

TECHNICAL FIELD

The present invention relates to a method of eliminating the inclusion of gas bubbles when filling of brake fluid into a hydraulic automotive vehicle brake system.

BACKGROUND OF THE INVENTION

German patent application No. 43 37 133 discloses a hydraulic automotive vehicle brake system with wheel slip control which is equipped with additional non-return valves between the primary and secondary circuits to let the air in the secondary circuit escape to the primary circuit during bleeding of the brake system. The additional arrangement of non-return valves necessitates special structural modifications to the brake system which automatically increase manufacturing costs.

Generic EP patent 0 543 187 describes a method of repeated vacuum charging of the primary circuit of an anti-lock automotive vehicle brake system after the brake fluid has been removed from the primary circuit for the purpose of installation into an automotive vehicle. To this end, the primary circuit includes a filter element downstream of a damping chamber which is adapted to the surface stress of the brake fluid so that the brake fluid under vacuum cannot escape from the damping chamber.

Further, European patent application No. 275 351 discloses an undersaturated brake fluid which has only a low solubility of gases and which exhibits a certain ability to take up the residual air in the brake system under vacuum.

An object of the present invention is to simplify a hydraulic automotive vehicle brake system of the above-mentioned type as regards the bubble-free filling process to such an effect that the design necessary for the hydraulic automotive vehicle brake system is maintained, and the need for additional structural modifications for the purpose of bleeding and bubble-free filling of the secondary circuit of the brake system is eliminated. Also, it is desirable to absorb the air disposed in the secondary circuit in the brake fluid in a fashion as good as possible.

BRIEF DESCRIPTION OF THE DRAWINGS

FIG. 3 depicts in a diagram the switching activities of the function elements shown in FIG. 1.

DETAILED DESCRIPTION OF THE PREFERRED EMBODIMENTS

Figure 1:
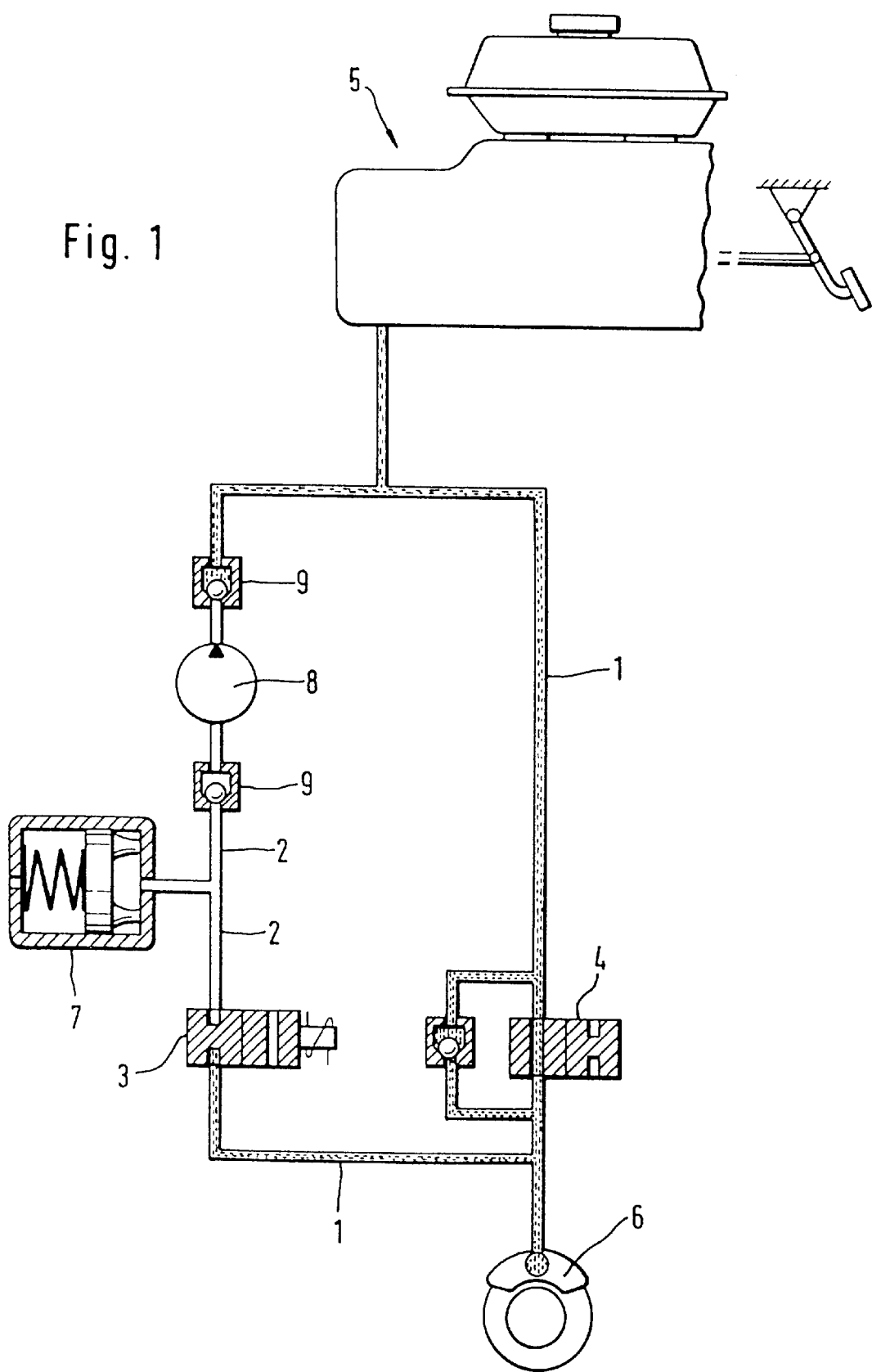
FIG. 1 depicts the basic circuit structure of a hydraulic slip controlled vehicle brake system which operates according to the return delivery principle.

Based on the basic design of a slip-controlled automotive vehicle brake system illustrated in FIG. 1, initially, reference is made to the known features of the system which, for wheel slip control, includes an inlet valve element 4 and an outlet valve element 3. A first channel portion 1 which accommodates the inlet valve element 4 leads from a braking pressure generator 5 to a wheel brake 6. A second channel portion 2 which includes the outlet valve element 3 and a pressure accumulator 7 leads from the wheel brake 6 to the suction side of a pump 8. The pump 8, with its pressure side, is connected to the first channel portion 1 by way of a pump valve 9. Another pump valve is arranged in the second channel portion 2 and performs the function of a pump suction valve. The second channel portion 2 is normally isolated from the first channel portion 1 by the outlet valve element 3 which is closed in the basic position. This area of the hydraulic system, which is normally isolated by electrically and hydraulically operable valves, thus, forms the so-called secondary circuit to which also the low-pressure accumulator 7 is connected and from which the pump 8 aspirates pressure fluid when needed in the braking operation. FIG. 1 shows the primary circuit, which corresponds to the channel portion 1, filled with brake fluid after a bleeding process and filling process. To illustrate the filling condition, the corresponding channel portion 1 is shaded in black. Prior to filling the primary circuit, which is typically carried out by the vehicle manufacturer in a conventional fashion or by way of high-vacuum filling technology, there is an inclusion of air in the secondary circuit which is now absorbed by the hydraulic fluid in the primary circuit without bubbles due to the method referred to in the following.

The method of bubble-free filling of the hydraulic automotive vehicle brake system which will be disclosed hereinbelow preconditions a bleeding process of the primary circuit wherein all electromagnetically driveable valve elements can remain in their initial position. A vacuum leakage test should generally follow the bleeding process to detect and eliminate any possible leakages. Typically, the primary circuit is acted upon by high vacuum. Appropriately, the bleeding process and a recommended vacuum leakage test is succeeded by a repeated bleeding which is followed by a filling process of the primary circuit with degased brake fluid. All electrically driveable valve elements again remain in their initial position. The filling process of the primary circuit concerns a pressure filling which should then be followed by a phase of stabilization of the fluid pressure in the primary circuit. Subsequent to the filling process of the primary circuit is a filling process of the secondary circuit with the brake fluid of the primary circuit.

Figure 2:
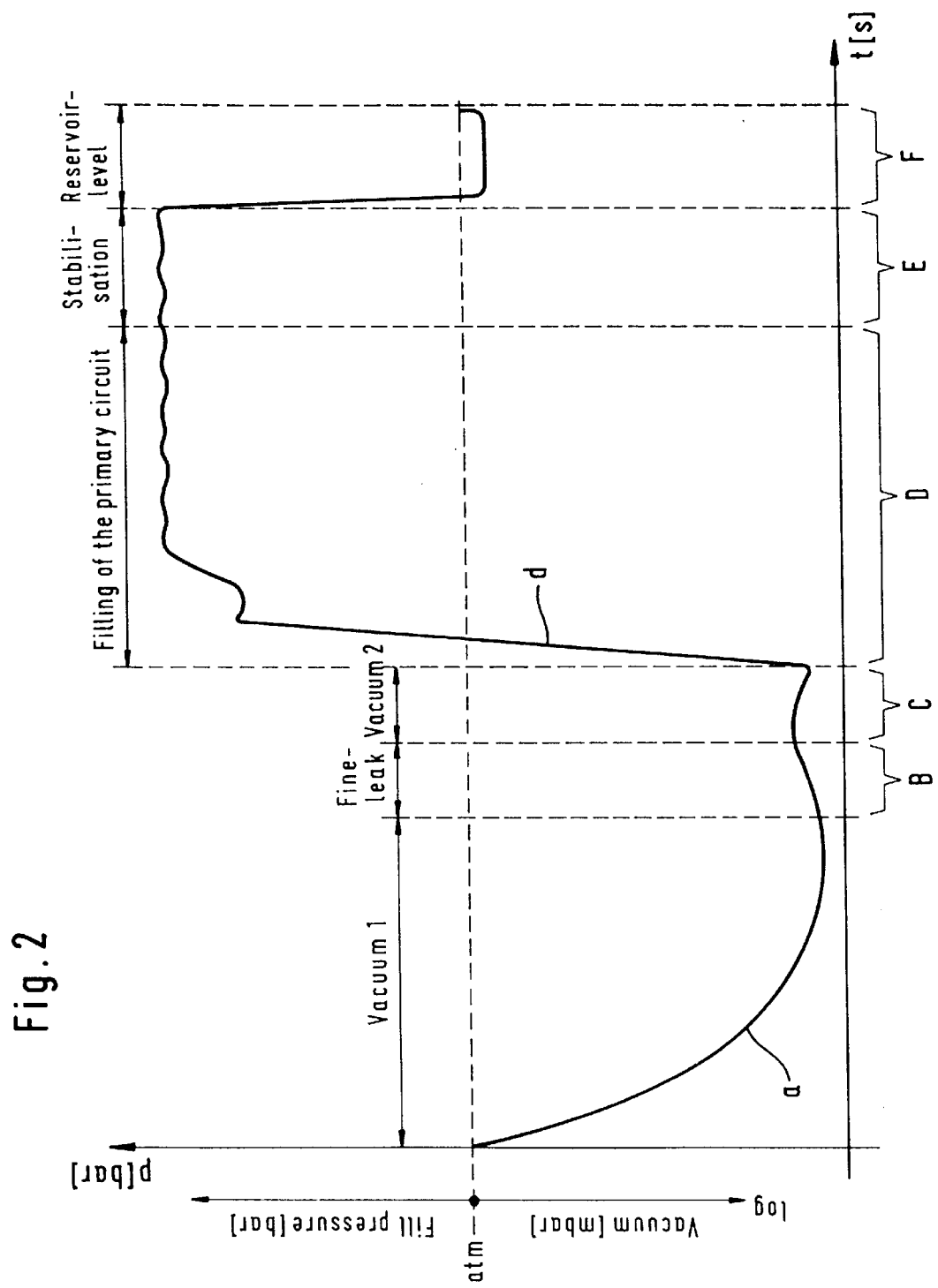
FIG. 2 shows in a diagram the pressure variation within the brake system during the bleeding and filling process.

The individual steps of the above-mentioned provisions for the bleeding and filling of the system are represented in the diagram of FIG. 2. The abscissa in the diagram shows the time variation and the ordinate shows the pressure variation during the filling process of the brake system. The relatively steep pressure decline corresponding to the curve portion 'a' is apparent at the beginning of the bleeding process, which extends almost vertically relative to the abscissa towards the end of the first bleeding process and rises slightly at the end of the leakage test B until, due to renewed bleeding, the desired high vacuum is reached in the portion C. When the bleeding process is completed, the subsequent brake fluid filling operation along the portion D makes the pressure (characteristic curve d) in the primary circuit rise considerably. The phase of stabilization (portion E) follows before the pressure in the portion F of the diagram finally sets to the atmospheric pressure after the filling device has been disconnected.

Details of the subsequent filling of the secondary brake circuit with brake fluid under high pressure from the primary circuit which is followed by the bubble-free phase of absorption of the air displaced from the secondary circuit by the brake fluid disposed in the primary circuit will be explained by making reference to the subsequent diagram 3. The brake pedal (characteristic curve g) is applied during the absorption process so that a hydraulic pressure of approximately 50 to 70 bar prevails in the brake system. The absorption process is programmed in order to have air inclusions of the secondary circuit resolved without bubbles in the brake fluid in any case. Among others, the program control provides that the pump (characteristic curve h) is permanently running during the absorption process and the inlet valve elements (characteristic curve i) and the outlet valve elements (characteristic curve j) are electromagnetically energized in a determined pulse/pause ratio. FIG. 3 shows the characteristics of the squarewave pulses. This quasi causes chopping and better resolution of the air volume in the brake fluid volume to the end of accommodating the air in the brake fluid in the sense of the absorption process. By using brake fluid which is undersaturated in terms of its air contents, the brake fluid can resolve the air volume and accommodate it without bubbles in the absorption process. Further, it can be seen in the diagram of FIG. 3 that the pulse length of the electromagnetically excited outlet valve elements (characteristic curve j) is smaller than the pulse length of the electromagnetically excited inlet valve elements (characteristic curves i) plotted against the time of the absorption process along the abscissa. In addition, it can be taken from the diagram that the pulse lengths of the electromagnetically excited inlet and outlet valve elements are superimposed on one another. In the present embodiment, the opening pulse for the inlet valve elements of the rear axle follows with time delay in relation to the opening pulse of the inlet valve elements of the front axle. Because the opening pulse length of the inlet valve elements of both characteristic curves i have been chosen to be equally long in time, the inlet valve elements on the rear axle will close, offset in time, automatically after each opening interval. The opening pulses for the outlet valve elements corresponding to the characteristic curve j are superimposed on the opening pulses of the inlet valve elements and amount only to a fourth of the on-cycle of the inlet valves approximately.

In case the above-mentioned slip-controlled brake system is supplemented by an electrically operable, normally closed change-over valve for the purpose of automatic brake intervention, the pulse patterns shown in FIG. 3 must be supplemented by the switching cycles of the change-over valve. Care should be taken that the pulse/pause actuation of the change-over valve follows in about a course of the characteristic curve j, however, offset in time within the respective closing phase of the outlet valves.

Advantageously, the need for electrically activating the outlet valve elements during bleeding is eliminated by the method according to the present invention. Also, no additional prefilling measures and structural modifications to the system are required because the air contents in the secondary circuit is accommodated in a brake fluid undersaturated with air in a relatively simple, program-controlled absorption process.

LIST OF REFERENCE NUMERALS 1 first channel portion
2 second channel portion
3 outlet valve
4 inlet valve
5 braking pressure generator
6 wheel brake
7 low-pressure accumulator
8 pump
9 pump valve

What is claimed is:

1. Method of bubble-free filling of brake fluid into a hydraulic automotive vehicle brake system which includes a brake pedal for the application of a wheel brake that is equipped with an automatic brake intervention system which includes a pump of which delivers brake fluid from a secondary circuit into a primary circuit according to a return delivery principle under operating conditions, wherein at least one bleeding process and filling process with brake fluid under high pressure takes place that is related exclusively to the primary circuit, and wherein said hydraulic automotive vehicle brake system includes a plurality electrically operable valve elements which remain in their initial position during the bleeding process, comprising the steps of:

filling the primary circuit with degased undersaturated brake fluid after completing the bleeding process, pressurizing the brake fluid in the primary circuit sufficiently highly such that air inclusions in the area of the secondary circuit are conveyed into the primary circuit by way of the pump as soon as one of said plurality of electrically operable valve elements which normally isolates the secondary circuit from the primary circuit switches to an open position, applying the brake pedal, operating the pump continuously, and exciting the inlet and outlet valve elements electromagnetically in a pulse/pause ratio which is responsive to the resolution of the air volume in the brake fluid volume until the air inclusions of the secondary circuit are taken up in the brake fluid of the primary circuit and resolved without bubbles.

2. Method as claimed in 1, further including applying a high vacuum to the unfilled primary circuit of the brake system.

3. Method as claimed in claim 1, wherein one of said plurality of electrically operable valve elements is an outer valve and another of said plurality of electrically operable valve elements is an input valve, and wherein a pulse length delivered to the outlet valve is shorter than a pulse length delivered to the inlet valve for the duration of the bleeding process.

4. Method as claimed in claim 3, wherein the pulse lengths delivered to the inlet and outlet valve elements are superposed on one another.

5. Method as claimed in claim 1, further including the steps of conducting a vacuum leakage test following the bleeding process.

* * * * *